US008671087B2

(12) United States Patent
Wills et al.

(10) Patent No.: US 8,671,087 B2
(45) Date of Patent: Mar. 11, 2014

(54) SYSTEM, METHOD AND COMPUTER PROGRAM PRODUCT FOR SCANNING AND INDEXING DATA FOR DIFFERENT PURPOSES

(75) Inventors: Ronald Holland Wills, McKinney, TX (US); Charles Allen Ross, Plano, TX (US); George L. Heron, Forest Hill, MD (US)

(73) Assignee: McAfee, Inc., Santa Clara, CA (US)

( * ) Notice: Subject to any disclaimer, the term of this patent is extended or adjusted under 35 U.S.C. 154(b) by 30 days.

(21) Appl. No.: 13/311,089

(22) Filed: Dec. 5, 2011

(65) Prior Publication Data

US 2012/0079117 A1    Mar. 29, 2012

Related U.S. Application Data (63) Continuation of application No. 11/959,113, filed on Dec. 18, 2007, now Pat. No. 8,086,582.

(51) Int. Cl.
*G06F 17/30* (2006.01)
(52) U.S. Cl.
USPC ............... 707/705; 707/966; 726/1; 709/223
(58) Field of Classification Search
CPC .................. G06F 17/30864; G06F 17/30867; G06F 17/30067
USPC ........ 707/705, 999.003, 966, 999.002; 726/1; 709/223
See application file for complete search history.

(56) References Cited

U.S. PATENT DOCUMENTS

| | | | |
|---|---|---|---|
| 4,633,393 A | 12/1986 | Rundell | |
| 5,111,391 A * | 5/1992 | Fields et al. | 705/7.14 |
| 5,987,610 A | 11/1999 | Franczek et al. | |
| 6,073,142 A | 6/2000 | Geiger et al. | |
| 6,272,641 B1 * | 8/2001 | Ji | 726/24 |
| 6,460,050 B1 | 10/2002 | Pace et al. | |
| 6,765,864 B1 * | 7/2004 | Natarajan et al. | 370/224 |
| 6,823,341 B1 | 11/2004 | Dietz | |
| 7,028,022 B1 | 4/2006 | Lightstone et al. | |
| 7,096,503 B1 * | 8/2006 | Magdych et al. | 726/25 |
| 7,178,166 B1 * | 2/2007 | Taylor et al. | 726/25 |
| 7,219,098 B2 | 5/2007 | Goodwin et al. | |
| 7,263,528 B2 | 8/2007 | Haff et al. | |
| 7,441,024 B2 * | 10/2008 | Sanghvi et al. | 709/223 |
| 7,467,225 B2 * | 12/2008 | Anerousis et al. | 709/238 |
| 7,472,422 B1 | 12/2008 | Agbabian | |
| 7,506,155 B1 | 3/2009 | Stewart et al. | |
| 7,516,476 B1 | 4/2009 | Kraemer et al. | |
| 7,634,458 B2 * | 12/2009 | Singhal et al. | 1/1 |
| 7,712,138 B2 * | 5/2010 | Zobel et al. | 726/25 |
| 7,809,914 B2 * | 10/2010 | Kottomtharayil et al. | 711/170 |
| 7,865,965 B2 * | 1/2011 | Kramer et al. | 726/30 |
| 7,937,365 B2 * | 5/2011 | Prahlad et al. | 707/640 |
| 7,950,007 B2 * | 5/2011 | Mohindra et al. | 717/173 |
| 7,979,906 B2 * | 7/2011 | McColgan et al. | 726/24 |
| 8,108,923 B1 * | 1/2012 | Satish et al. | 726/11 |
| 8,185,913 B1 * | 5/2012 | Talwar et al. | 719/319 |
| 8,205,208 B2 * | 6/2012 | Mausolf et al. | 718/104 |

(Continued)

*Primary Examiner* — Phuong Thao Cao
(74) *Attorney, Agent, or Firm* — Patent Capital Group (57) ABSTRACT

A system, method and computer program product are provided for scanning and indexing data for different purposes. Included is a universal engine operable to scan and index data stored in at least one device, for a plurality of different purposes. Further provided is at least one application for controlling the universal engine to perform the scanning and indexing for at least one of the different purposes.

20 Claims, 7 Drawing Sheets

(56) References Cited

U.S. PATENT DOCUMENTS

| | | | |
|---|---|---|---|
| 8,432,570 B1* | 4/2013 | Couvering | 358/1.15 |
| 2002/0078134 A1 | 6/2002 | Stone et al. | |
| 2002/0169819 A1* | 11/2002 | Nguyen et al. | 709/202 |
| 2002/0178217 A1* | 11/2002 | Nguyen et al. | 709/203 |
| 2003/0131256 A1 | 7/2003 | Ackroyd | |
| 2004/0117624 A1 | 6/2004 | Brandt et al. | |
| 2004/0193918 A1 | 9/2004 | Green et al. | |
| 2004/0210320 A1* | 10/2004 | Pandya | 700/1 |
| 2004/0249824 A1 | 12/2004 | Brockway et al. | |
| 2005/0010821 A1* | 1/2005 | Cooper et al. | 713/201 |
| 2005/0044016 A1 | 2/2005 | Irwin et al. | |
| 2005/0066165 A1 | 3/2005 | Peled et al. | |
| 2005/0154733 A1 | 7/2005 | Meltzer et al. | |
| 2005/0198098 A1* | 9/2005 | Levin et al. | 709/200 |
| 2006/0062360 A1* | 3/2006 | O'Connor et al. | 379/88.17 |
| 2006/0080667 A1* | 4/2006 | Sanghvi et al. | 719/310 |
| 2006/0085852 A1* | 4/2006 | Sima | 726/22 |
| 2006/0101520 A1* | 5/2006 | Schumaker et al. | 726/25 |
| 2006/0136570 A1* | 6/2006 | Pandya | 709/217 |
| 2006/0184682 A1 | 8/2006 | Suchowski et al. | |
| 2006/0190441 A1 | 8/2006 | Gross et al. | |
| 2006/0256392 A1 | 11/2006 | Van Hoof et al. | |
| 2007/0130140 A1 | 6/2007 | Cytron et al. | |
| 2007/0136814 A1 | 6/2007 | Lee et al. | |
| 2007/0150574 A1* | 6/2007 | Mallal et al. | 709/223 |
| 2007/0150948 A1* | 6/2007 | De Spiegeleer | 726/22 |
| 2007/0250935 A1* | 10/2007 | Zobel et al. | 726/26 |
| 2007/0288247 A1* | 12/2007 | Mackay | 705/1 |
| 2007/0300299 A1 | 12/2007 | Zimmer et al. | |
| 2008/0005782 A1 | 1/2008 | Aziz | |
| 2008/0077594 A1 | 3/2008 | Ota | |
| 2008/0168048 A1 | 7/2008 | Bell et al. | |
| 2008/0196083 A1* | 8/2008 | Parks et al. | 726/1 |
| 2008/0201384 A1 | 8/2008 | Batterywala | |
| 2008/0276295 A1* | 11/2008 | Nair | 726/1 |
| 2008/0313639 A1 | 12/2008 | Kumar et al. | |
| 2008/0313733 A1* | 12/2008 | Kramer et al. | 726/22 |
| 2009/0031312 A1* | 1/2009 | Mausolf et al. | 718/102 |
| 2009/0049518 A1* | 2/2009 | Roman et al. | 726/1 |
| 2009/0064323 A1* | 3/2009 | Lin | 726/22 |
| 2009/0100162 A1* | 4/2009 | Holostov et al. | 709/223 |
| 2009/0138573 A1* | 5/2009 | Campbell et al. | 709/218 |
| 2009/0271842 A1 | 10/2009 | Baumhof | |
| 2009/0293103 A1 | 11/2009 | Palmer et al. | |
| 2010/0064341 A1 | 3/2010 | Aldera | |
| 2010/0180128 A1 | 7/2010 | Borden et al. | |

* cited by examiner

SYSTEM, METHOD AND COMPUTER PROGRAM PRODUCT FOR SCANNING AND INDEXING DATA FOR DIFFERENT PURPOSES

RELATED APPLICATION

This application is a continuation (and claims the benefit of priority under 35 U.S.C. §120) of U.S. application Ser. No. 11/959,113, filed Dec. 18, 2007, now U.S. Pat. No. 8,086,582, entitled "SYSTEM, METHOD AND COMPUTER PROGRAM PRODUCT FOR SCANNING AND INDEXING DATA FOR DIFFERENT PURPOSES," Inventor(s) Ronald Holland Wills, et al. The disclosure of the prior application is considered part of (and is incorporated by reference in) the disclosure of this application.

FIELD OF THE INVENTION

The present invention relates to data processing systems, and more particularly to systems capable of scanning and indexing data.

BACKGROUND

Security, compliance, and search software programs each require adaptive, and often overlapping, knowledge about the content, state, location, access, and usage of a dynamic corpus of data located within respective domains. For example, anti-malware software typically scans and stores information indicative of threats and implements remedial actions. Further, compliance software conventionally scans file content and logs file location and other state information, in order to apply predetermined policies to data usage and storage. Still yet, search software indexes data content to facilitate rapid searching and concept mapping, by using computer algorithms to automatically associate related words, phrases, concepts, etc.

Any attempt to combine the foregoing disparate solutions pose a variety of interoperability challenges by requiring multiple software agents, management layers, indexes, etc. Further, implementing disparate solutions would reduce system efficiency by virtue of the competing and overlapping use of system and network resources. Even still, any attempt to combine such systems would inevitably diminish human productivity by requiring multiple interfaces, policies, workflows, etc.; as well as be cost-prohibitive since they each typically require an enterprise to scale installation to maximize effectiveness.

There is thus a need for addressing these and/or other issues associated with the prior art.

SUMMARY

A system, method and computer program product are provided for scanning and indexing data for different purposes. Included is a universal engine operable to scan and index data stored in at least one device, for a plurality of different purposes. Further provided is at least one application for controlling the universal engine to perform the scanning and indexing for at least one of the different purposes.

DETAILED DESCRIPTION

Figure 1:
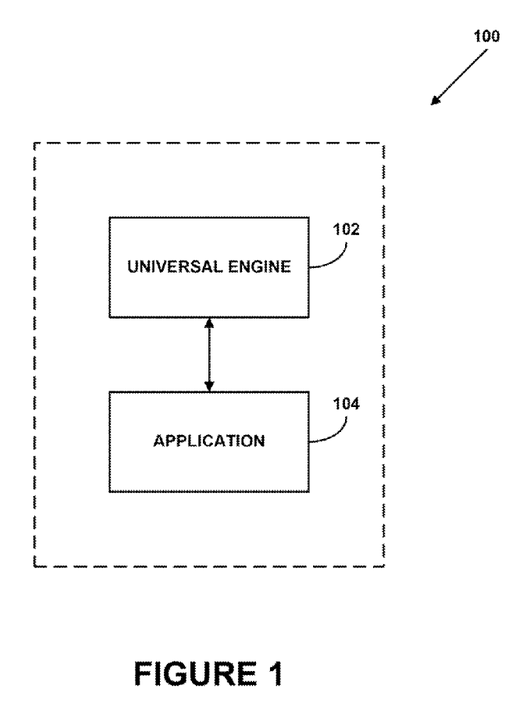
FIG. 1 illustrates a system for scanning and indexing data for different purposes, in accordance with one embodiment.

FIG. 1 illustrates a system 100 for scanning and indexing data for different purposes, in accordance with one embodiment. As shown, provided is a universal engine 102 operable to scan and index data stored in at least one device, for a plurality of different purposes. In the context of the present description, the universal engine 102 may include any hardware and/or software capable of such scanning and indexing of data for more than one purpose. It should be noted that, in various embodiments, the universal engine 102 may be operable to scan and index data stored in a single device or a plurality of different devices.

Further, such scanning may include any analysis of data, while the aforementioned indexing may refer to any processing which results in a data structure that is representative, at least in part, of the data, for facilitating subsequent analysis. Just by way of example, in one optional embodiment, the scanning may include the analysis of the data and/or indexed data, utilizing various criteria, patterns (e.g. signatures, etc.), rules, etc. for the purpose of reaching at least one conclusion.

Still yet, the indexing may, in different embodiments, include an automatic classification or manipulation of the data based on content of the data, a creator of the data, a location of the data, metadata associated with the data, and/or any other desired aspect of the data, in an embodiment where the indexing is based on a content of the data, various text analysis may be performed to identify key or repeated terms (e.g. nouns, verbs, etc.). Still yet, such words may be weighted as appropriate (e.g. based on location, use, etc.), Bayesian algorithms may be used, etc. To this end, content-related insight into the data may be provided by a data structure that has a size that is less than that of the data itself. Of course, such examples of contextual indexing are set forth for illustrative purposes only, as any indexing may be used that meets the above definition.

With continuing reference to FIG. 1, also provided is at least one application 104. Such application 104 may include any computer code adapted for controlling the universal engine 102 to perform the scanning and indexing for at least one of the different purposes. By this design, the universal engine 102 may be used for different purposes by using the desired application 104. It should be noted that the universal engine 102 may be controlled by the application 104 for absolutely any desired purpose. Just by way of example, such different purpose may include, but is not limited to a security purpose, a corporate governance purpose, a data loss prevention purpose, a risk management purpose, a legal purpose, a digital rights management purpose, a data classification purpose, a search purpose, etc.

More illustrative information will now be set forth regarding various optional architectures and features with which the foregoing framework may or may not be implemented, per the desires of the user. For example, the aforementioned scanning and indexing, as well as possibly any action prompted based on such scanning/indexing, may be performed based on predetermined policies. In such embodiment, different policies may be used in conjunction with different applications. In another embodiment, heuristics may be used to control such scanning and indexing, for improved performance, efficiency, etc.

It should be strongly noted that the following information is set forth for illustrative purposes and should not be construed as limiting in any manner. Thus, any of the following features may be optionally incorporated with, or without the exclusion of other features described.

Figure 2:
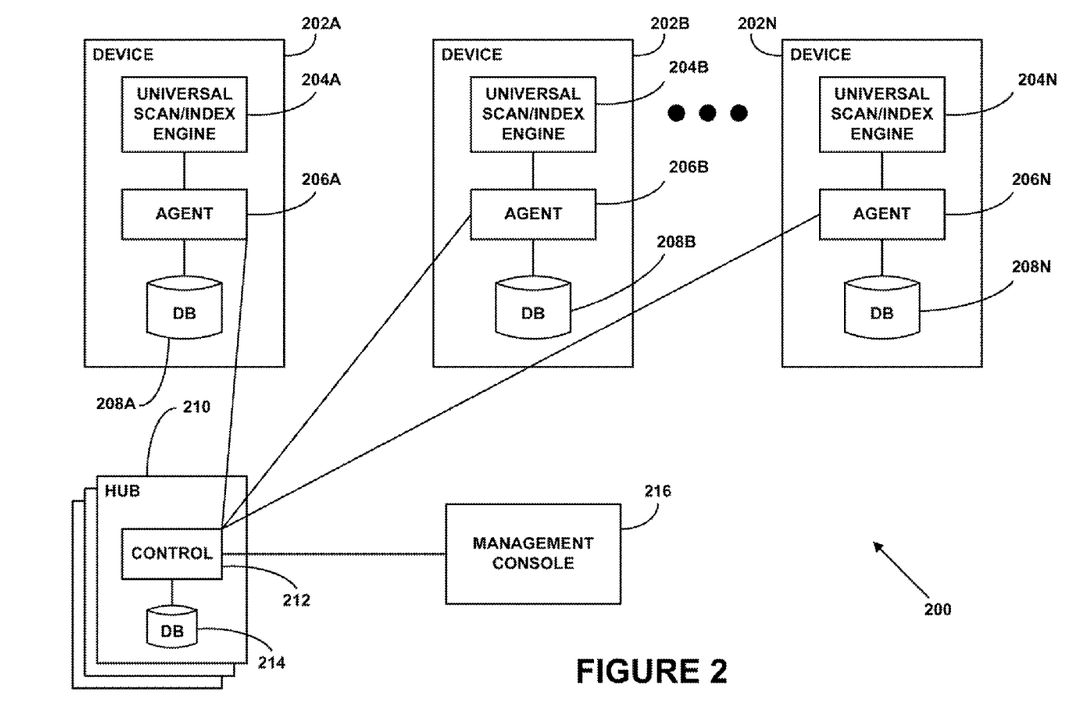
FIG. 2 shows a system for scanning and indexing data for different purposes, in accordance with another embodiment.

FIG. 2 shows a system 200 for scanning and indexing data for different purposes, in accordance with another embodiment. As an option, the system 200 may incorporate the functionality of the architecture and environment of FIG. 1. Of course, however, the system 200 may be implemented in any desired environment. It should also be noted that the aforementioned definitions may apply during the present description.

As shown, a plurality of devices 202A-N are provided. In the context of the present description, the devices 202A-N may each include a desktop computer, lap-top computer, hand-held computer, mobile phone, personal digital assistant (PDA), peripheral (e.g. printer, etc.), any component of a computer or related system, and/or any other type of logic for that matter. In additional embodiments, virtualization techniques may be used in conjunction with the devices 202A-N.

As shown, the devices 202A-N are equipped with universal engines 204A-N capable of scanning and indexing data stored on the respective device. In one embodiment, the universal engines 204A-N may include any combination of hardware and/or software for providing a "natural language processor" that is capable of sorting through a plethora of business-formatted information files, regardless of the data type, file type, file location, etc.

Agents 206A-N remain in communication with the associated universal engines 204A-N, as shown, for controlling such scanning and indexing, as well as taking any desired resulting action, etc. For example, each agent 206A-N may store results of such scanning and indexing in a local database 208A-N, for reasons that will soon become apparent. While the agents 206A-N are shown to reside on the devices 202A-N, embodiments are contemplated in which the agents 206A-N communicate with, but remain separate from the devices 202A-N. In one embodiment, the agents 206A-N may take the form of self-populating/self-propagating bots that automatically crawl a network in the background.

Coupled to one or more of the devices 202A-N is at least one hub 210. Such coupling may, in one embodiment, be accomplished via a network including, but not limited to a local area network (LAN), a wireless network, a wide area network (WAN) such as the Internet, a peer-to-peer network, a personal area network (PAN), etc.

Further, it should be noted that, in various embodiments, a plurality of the hubs 210 may be situated in different regions and further be coupled to different subsets of the devices 202A-N. Still yet, a hierarchical framework may further be provided such that the hubs 210 (or subsets thereof) are coupled to additional hubs (not shown). For instance, a hierarchy of regional servers and at least one central server may be provided.

With continuing reference to FIG. 2, each hub 210 is equipped with control logic 212 for communicating with the agents 206A-N for controlling the same. In one embodiment, this may be accomplished utilizing policies which may be propagated from the hub 210 to the agents 206A-N for controlling the manner in which the agents 206A-N control the universal engines 204A-N as well as any action taken at the devices 202A-N.

To this end, any aspect (e.g. priority, sequence, location, etc.) of the scanning, indexing, and/or resulting action may be controlled based on one or more policies. For example, one or more policies may dictate the criteria, patterns (e.g. signatures, etc.), etc. with which the data is scanned. Further, such policies may specify what particular data is indexed, based on specific criteria (e.g. a creator of the data, a location of the data, metadata associated with the data, words in the data, etc.). Even still, the policies may indicate which actions are to be taken based on the scanned/indexed data. This may be accomplished, for example, using specific rules that trigger an action based on results of a policy-specific scan of data that has been indexed in a policy-specific manner.

In one embodiment, different policies may be used in conjunction with different applications. While such applications are not shown in FIG. 2, they may include client-based and/or network-based applications that are tailored for using the resources of the system 200 for specific purposes. In various embodiments, such policies may be included with the applications and/or remain a component of the system 200.

By this design, the policies may be used to scan/index data in a manner that makes it more effectively available for use by a purpose-specific application. For instance, a security application may require data to be scanned/indexed differently with respect to a financial application. Further, the actions taken as a result of the uniquely scanned/indexed data will also vary significantly. To this end, the policies may be used to tailor the various aspects of the system 200 to accommodate the purpose of a particular application executed by the system 200.

To generate and/or modify the aforementioned policies and provide additional administrative functions (e.g. propagation of scan/index results among the local/remote databases, etc.), a centralized management console 216 remains in communication with the hub 210. To this end, policies may be dynamically created and applied on a real-time basis. In various embodiments, the management console 216 may be integrated with or separate from the hub(s) 210. Further, the management console 216 may include a graphical user interface (GUI) for facilitating such operation. In one specific embodiment, the management console 216 may include the ePolicy Orchestrator® offered by McAfee®, Inc.

With continuing reference to FIG. 2, each hub 210 is further equipped with a remote database 214 for storing results of the local scanning and indexing performed by the universal engines 204A-N. Thus, the device-specific scan/index results may be stored in the local database 208A-N, and an aggregation of such results may be stored in the remote database 214. Of course, such aggregation of results stored in each remote database 214 may be copies of the local database 208A-N or a subset and/or compressed representation thereof. By this design, appropriate data may be stored throughout a network, making it conveniently available as necessary. In one embodiment, such distribution of data may be applied based on the aforementioned policies, as well.

As an option, heuristics may be employed in any desired capacity in the administration of the system 200. For example, the aforementioned policies may be configured or dynamically adapted based on heuristics gathered across the system 200 by way of a feedback loop. In one embodiment, the heuristics are fed back from the devices 202A-N utilizing the associated agents 206A-N. Such heuristics may include, but are not limited to an amount of processing/communication resources available at the associated device 202A-N, a schedule of such resource availability, etc.

Thus, the system 200 is capable of intelligently implementing the foregoing policies in view of such heuristics. For example, the heuristics may drive when and where the indexing and scanning takes place; a location where results of the indexing and scanning are stored; a timing of a communication of the policies, scan/index results, etc.; a timing of any actions taken based on the scan/index results, etc. Of course, such heuristics-driven controls are set forth for illustrative purposes only, as any aspect of the system 200 may be heuristically controlled.

To this end, the system 200 coordinates and/or consolidates scanning, indexing, and policy enforcement efforts using a distributed, heuristic data management system and a feedback loop that is governed by a common set of policies that are managed using the single management console 216. The system 200 is thus self-tuning, self-evolving, and self-modifying to provide an ever-increasingly capable data collection/analysis botnet hierarchy. With guiding scripts/policies entered by humans, the system 200 is capable of narrowing its focus in order to provide increasingly relevant data and/or conclusions based on the analysis of data collected thus far. These refined data results may then be delivered to an inference engine which is able to coalesce the sorted/prioritized data in order to present to the user a result that is best tuned to the original request issued to the system 200.

In one example of use, each agent 206A-N updates, coordinates, and enforces a set of electronic policies, and the multi-purpose universal engines 204A-N analyze system data as directed by the policy set, and may act based on correlating findings with the policy set. Still yet, each local database 208A-N stores scan results in accordance with the policy set, while each hub 210 communicates with the local databases 208A-N to facilitate data retrievals, as needed, for further analysis or use.

The management console 216, in turn, controls the system 200, updates agent software, and directs data migration from local to centralized indexes. To facilitate such control, the local agents 206A-N communicate local operating conditions, in addition to predetermined indicators, back to the management console 216, thus providing heuristic feedback that can be used at the administrator level to adjust a priority, nature and sequence of policy enforcement actions across an enterprise, or take specialized action on a specific resource or group of resources.

Figure 3:
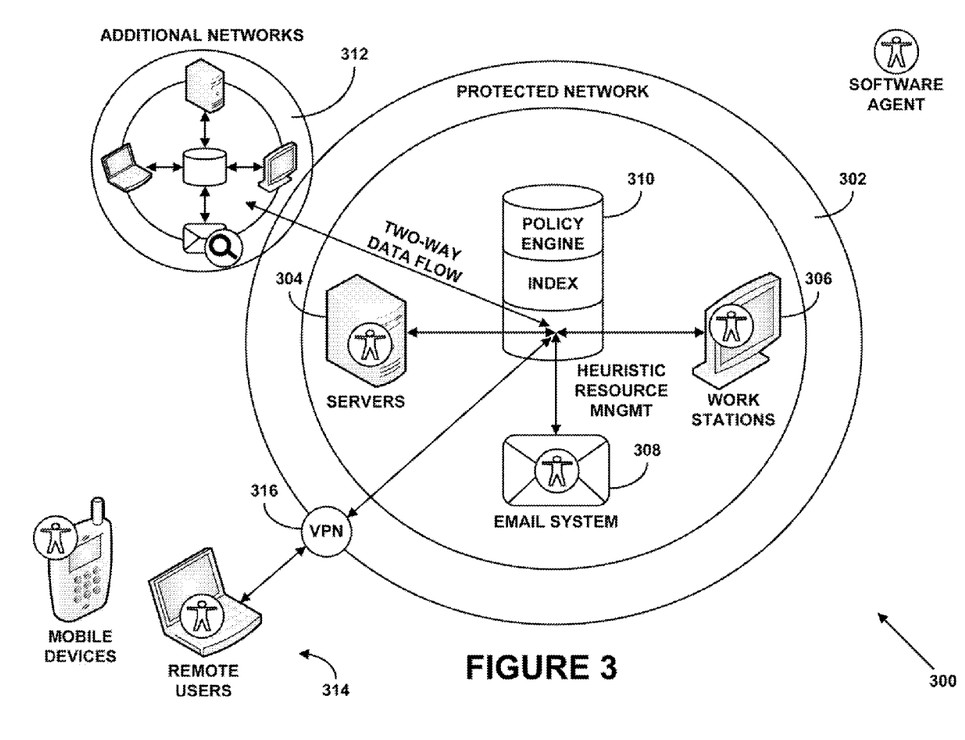
FIG. 3 shows a network level system for scanning and indexing data for different purposes, in accordance with yet another embodiment.

FIG. 3 shows a network level system 300 for scanning and indexing data for different purposes, in accordance with yet another embodiment. As an option, the system 300 may incorporate the functionality of the architecture and environment of FIGS. 1-2. Of course, however, the system 300 may be implemented in any desired environment. Again, the aforementioned definitions may apply during the present description.

As shown, a protected network 302 is provided including a plurality of components including, but not limited to servers 304, workstations 306, an email system 308, etc. Coupled to such components is logic 310 adapted for scanning and indexing data stored on such components, storing results of such processing, and taking any resulting action based on heuristically-driven policies.

As further shown, an additional network 312 as well as additional devices 314 may be provided. In one embodiment, such additional network 312 and/or additional devices 314 may communicate with the protected network 302 by way of a virtual private network (VPN) connection 316 or utilizing any other desired technique. To this end, scan/index results and policy information may be distributed among multiple networks and devices, in a secure manner. For example, the protected network 302 may include data that is to remain most secure, while other data may be stored at the additional network 312 as well the additional devices 314.

Figure 4:
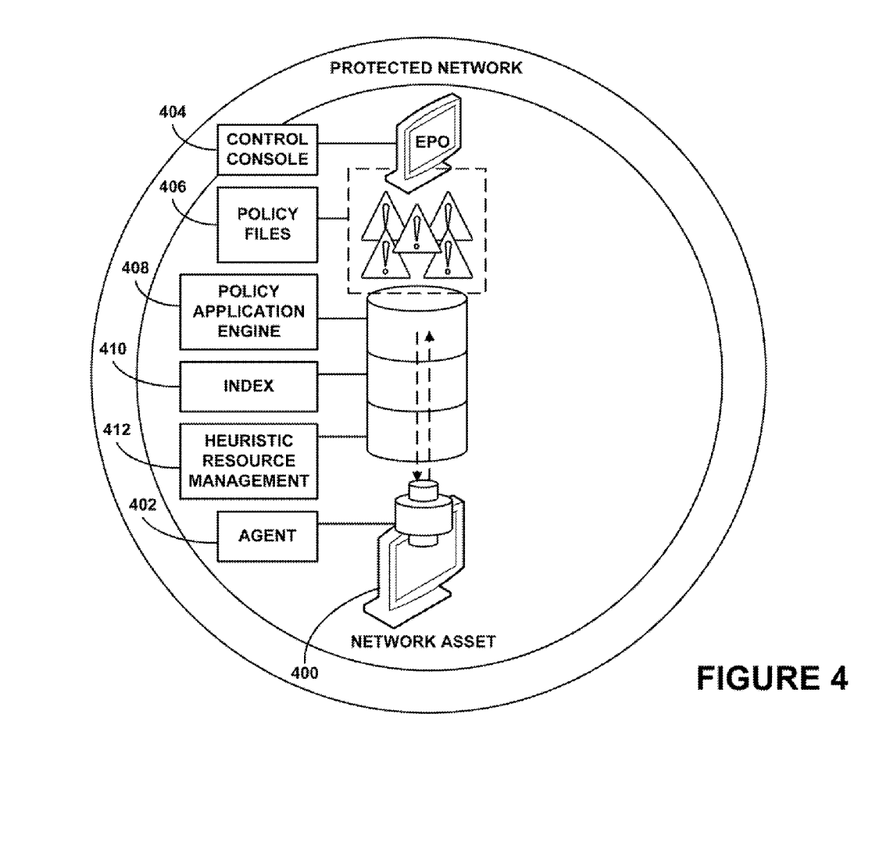
FIG. 4 shows a device for scanning and indexing data for different purposes, in accordance with still yet another embodiment.

FIG. 4 shows a device 400 for scanning and indexing data for different purposes, in accordance with still yet another embodiment. As an option, the device 400 may be incorporated in the context of the architecture and environment of FIGS. 1-3. Of course, however, the system 400 may be implemented in any desired environment. Yet again, the aforementioned definitions may apply during the present description.

As illustrated, the device 400 includes an agent 402 loaded thereon which allows local indexing of data and policy enforcement that is synchronized by a central administrator (e.g. via a control console 404, etc.). Further included are a variety of components including a plurality of policy files 406, a policy application engine 408, an index component 410, and a heuristic management component 412.

In use, the policy files 406 are received under the direction of the control console 404 for use by the policy application engine 408 to provide for specific actions to be invoked by different applications. Such policy application engine 408 executes policies in the policy files 406 based on pre-set factors and heuristic analysis of local and system-level conditions. Further, the index component 410 provides for a dynamic repository of file content and metadata, thus serving as an enterprise knowledge storehouse. The heuristic management component 412 controls the timing/size of data flow between resources based on priority, bandwidth, and/or asset usage, etc. To this end, data may be locally indexed and transferred to a central repository; and updates, queries, commands, etc. may be transmitted back.

Figure 5A:
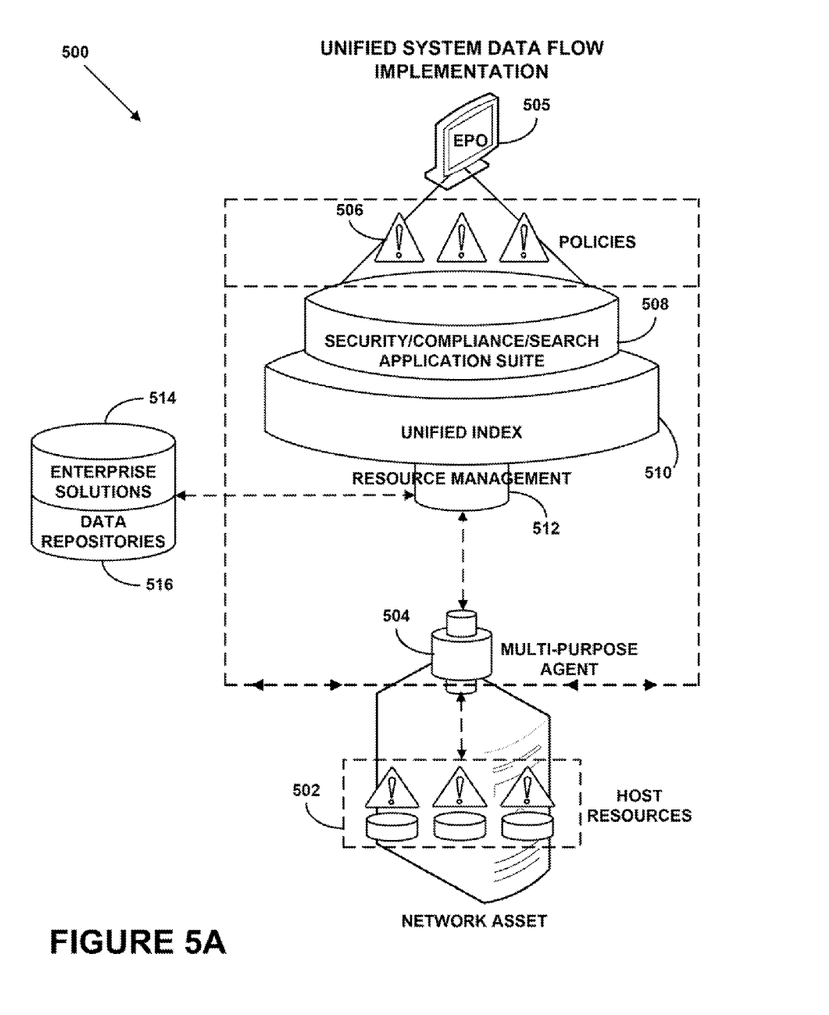
FIGS. 5A-5B show a system for scanning and indexing data for different purposes, in accordance with different embodiments.
Figure 5B:
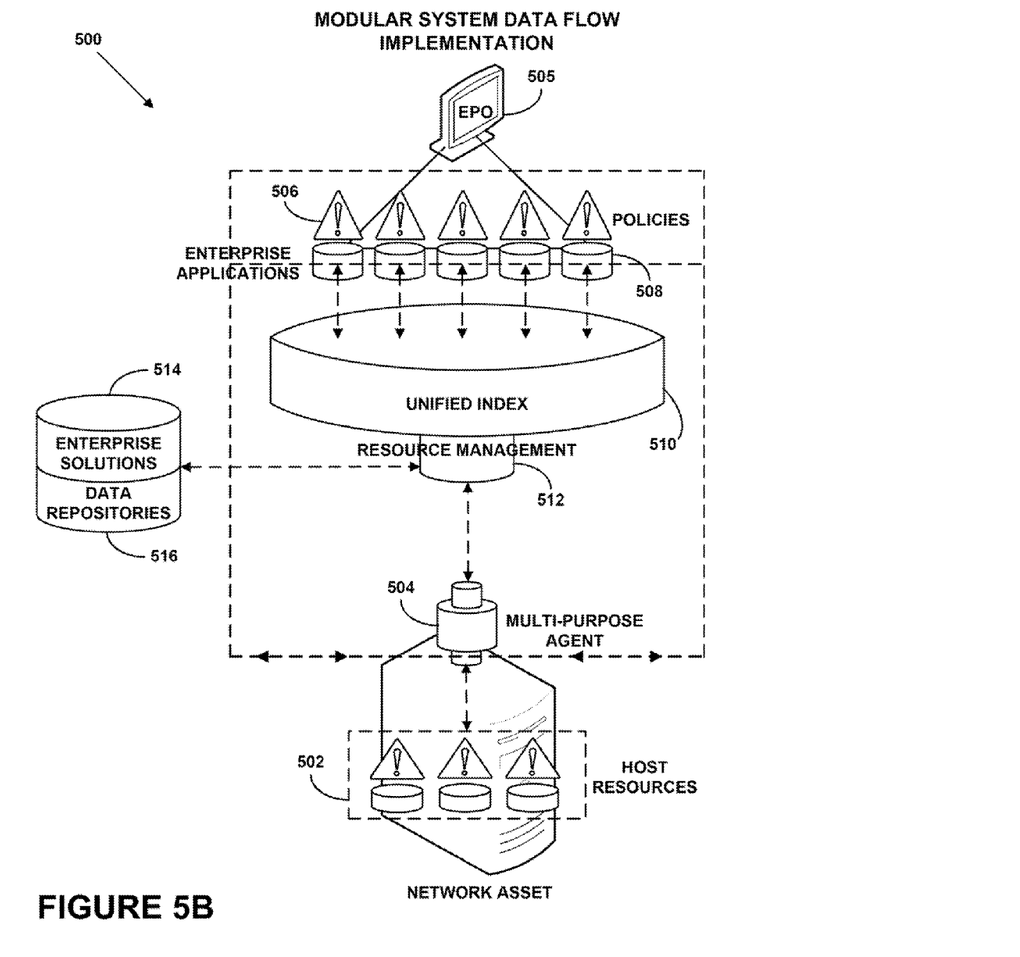

FIGS. 5A-5B show a system 500 for scanning and indexing data for different purposes, in accordance with different embodiments. As an option, the system 500 may incorporate the functionality of the architecture and environment of FIGS. 1-4. Of course, however, the system 500 may be implemented in any desired environment. Yet again, the aforementioned definitions may apply during the present description.

As shown in FIG. 5A, the system 500 includes at least one device 502 equipped with a multi-purpose agent 504 that has access to a multitude of resources. Such agent 504 serves to synchronize with a management console 505 and hook local applications, ports, resources, etc. to monitor activity and enforce a plurality of policies 506. Such policies 506 dictate what type of data is indexed, and then leverage resource management to determine where and when to index data, as will soon become apparent.

In use, the management console 505 may administer the policies 506 by distributing the same to enterprise and host-based applications 508. Such applications 508 may include security, compliance, search and any other type of programs that depend, at least in part, on scanning and indexing of data. While FIG. 5A illustrates the applications 508 being organized in a single suite of applications, it should be noted that other embodiments are contemplated where the applications 508 are discretely provided. See, for example, FIG. 5B.

Further, a unified index storage 510 connects to all data sources, providing enterprise search and data classification which can be leveraged by the designated applications 508. Under the control of a resource management module 512, complex computing tasks can be performed using idle machines in another geographical location to minimize impact on network performance during work hours. To accomplish this, the resource management module 512 may remain in communication with a variety of enterprise solutions 514 and data repositories 516.

Thus, the resource management module 512 may provide for workload distribution across the network, based on bandwidth, usage, and priority factors. Further, large data transfers and complex computing functions may take place when resources are idle or underutilized. For example, during work hours, indexing may occur locally as a background task (e.g. using servers, workstations, etc.). Further, at night or during idle time, indexed data may be transferred from the workstations and servers to regional data hubs. Likewise, policy updates and instructions may be distributed from the hubs to each network device.

A distributed knowledge management system is thus provided including policy-based content and meta-data indexing of electronic data in a computer network utilizing a distributed indexing/storage architecture. In a variety of embodiments, such architecture may include, among other things, a central data indexing hub, regional data hubs, and local agents capable of performing and/or directing local indexing/storage functions based on predetermined policies and/or at the direction of the central or regional data hubs.

Further, heuristic resource management functionality may be provided that connects every network asset to the central data hub and/or regional hubs and provides real-time and/or on-access assessments of asset usage, state information, and data content. This data may, in turn, be used by the central or regional data hubs to regulate the implementation of data management policies and information requests, including a scope/frequency of indexing and security protocols. The data may further be used to coordinate and execute distributed computing functions, and monitor overall network integrity, efficiency, and usage.

Still yet, integrated policy application functionality may be provided that leverages the distributed data index and heuristic resource management modules to execute electronic policies across the network or on specific network assets. Policies may thus encompass data management, accessibility, security and compliance functions.

To this end, various features may or may not be provided, as desired. For example, the system may provide improved access to corporate knowledge stored as electronic data. It may employ automated data classification technologies to enforce policies and manage information access/use (security), maintenance, storage and deletion. Further, investigative efforts, including audits and electronic discovery, may be streamlined. Network assets may also be leveraged to perform complex computing tasks and minimize under-utilization of resources. Thus, provided is a comprehensive data management model that integrates resource management, information accessibility, security, and policy enforcement in the context of a networked computing environment.

Figure 6:
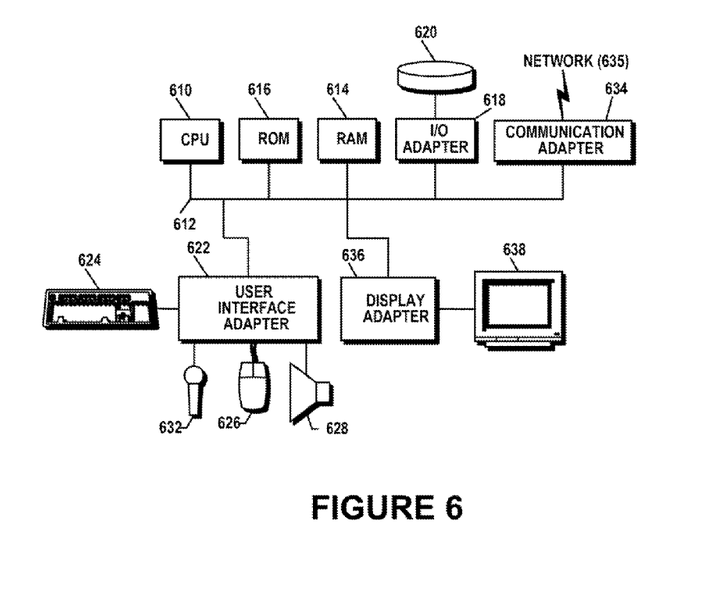
FIG. 6 shows a representative hardware environment that may be associated with any of the devices illustrated in the previous figures, in accordance with one embodiment.

FIG. 6 shows a representative hardware environment that may be associated with any of the devices illustrated in the previous figures, in accordance with one embodiment. Such figure illustrates a typical hardware configuration of a workstation in accordance with one embodiment having a central processing unit 610, such as a microprocessor, and a number of other units interconnected via a system bus 612.

The workstation shown in FIG. 6 includes a Random Access Memory (RAM) 614, Read Only Memory (ROM) 616, an I/O adapter 618 for connecting peripheral devices such as disk storage units 620 to the bus 612, a user interface adapter 622 for connecting a keyboard 624, a mouse 626, a speaker 628, a microphone 632, and/or other user interface devices such as a touch screen (not shown) to the bus 612, communication adapter 634 for connecting the workstation to a communication network 635 (e.g., a data processing network) and a display adapter 636 for connecting the bus 612 to a display device 638.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
    a processor;
    a memory coupled to the processor; and
    a communication adapter configured to receive, from each device of a plurality of devices, processing resources available at the device and a schedule of resource availability for the device, and to distribute one or more policies to the plurality of devices wherein
    the one or more policies are generated based on scanning results provided by the plurality of devices;
        the processing resources available at each of the plurality of devices; and
        the schedule of resource availability for each of the plurality of devices, and the one or more policies indicate when an indexing and scanning should occur at each of the plurality of devices.

2. The apparatus of claim 1, wherein the communication adapter is further configured to receive the scanning results, which are to be presented in response to a request provided to the apparatus.

3. The apparatus of claim 1, wherein the apparatus is further configured to update agent software for each of the plurality of devices.

4. The apparatus of claim 1, wherein the apparatus is further configured to adjust a priority and a sequence of enforcement actions for the plurality of devices based on the scanning results.

5. The apparatus of claim 1, wherein the processor is further configured to determine a workload distribution across the plurality of devices, and the workload distribution factors in bandwidth characteristics associated with each of the plurality of devices.

6. The apparatus of claim 1, further comprising:
    a graphical user interface configured to generate the one or more policies.

7. The apparatus of claim 1, wherein the one or more policies specify which particular data is indexed based on authorship for the particular data or words in the particular data.

8. The apparatus of claim 1, wherein the apparatus is a management console.

9. A method implemented by an apparatus, comprising:
receiving, from each device of a plurality of devices, processing resources available at the device and a schedule of resource availability for the device; and
distributing one or more policies to the plurality of devices, wherein the one or more policies are generated based on scanning results provided by the plurality of devices; the processing resources available at each of the plurality of devices, and the schedule of resource availability for each of the plurality of devices; and
the one or more policies indicate when an indexing and scanning should occur at each of the plurality of devices.

10. The method of claim 9, further comprising:
updating agent software for each of the plurality of devices.

11. The method of claim 9, further comprising:
determining a workload distribution across the plurality of devices, wherein the workload distribution factors in bandwidth characteristics associated with each of the plurality of devices.

12. The method of claim 9, further comprising:
directing data migration from local indexes, which are associated with the plurality of devices, to centralized indexes existing on a network.

13. The method of claim 9, wherein the scanning results are initially stored in a local database and subsequently provided in a remote database in which the scanning results are aggregated.

14. The method of claim 9, wherein the one or more policies include signatures with which data is scanned by the plurality of devices.

15. The method of claim 9, wherein the one or more policies indicate actions to be taken by the plurality of devices based at least on a result of the indexing and scanning.

16. The method of claim 9, further comprising:
receiving, at an agent in one device of the plurality of devices, a particular policy via a network;
performing, with the agent, an action based on a particular result of scanning; and
communicating, from the agent, to the apparatus, available communication resources at the one device.

17. The method of claim 9, wherein at least a portion of the scanning results is stored at a regional server, which shares a same geographic area with the plurality of devices.

18. The method of claim 9, further comprising:
scanning and indexing data with a universal engine at each of the plurality of devices.

19. One or more non-transitory computer-readable media that include code for execution that, when executed by a processor, performs operations comprising:
receiving, from each device of a plurality of devices, processing resources available at the device and a schedule of resource availability for the device; and
distributing one or more policies to the plurality of devices, wherein the one or more policies are generated based on scanning results provided by the plurality of devices; the processing resources available at each of the plurality of devices, and the schedule of resource availability for each of the plurality of devices; and
the one or more policies indicate when an indexing and scanning should occur at each of the plurality of devices.

20. The one or more non-transitory computer-readable media of claim 19, wherein the one or more policies include signatures.

* * * * *

UNITED STATES PATENT AND TRADEMARK OFFICE
CERTIFICATE OF CORRECTION

| | | |
|---|---|---|
| PATENT NO. | : 8,671,087 B2 | Page 1 of 1 |
| APPLICATION NO. | : 13/311089 | |
| DATED | : March 11, 2014 | |
| INVENTOR(S) | : Ronald Holland Wills et al. | |

It is certified that error appears in the above-identified patent and that said Letters Patent is hereby corrected as shown below:

In the Claims:

In column 8, line 40, In Claim 1, delete "devices" and insert -- devices, --, therefor.

Signed and Sealed this
Third Day of June, 2014

Michelle K. Lee
*Deputy Director of the United States Patent and Trademark Office*